(12) United States Patent
Straub et al.

(10) Patent No.: US 11,161,545 B2
(45) Date of Patent: Nov. 2, 2021

(54) STEERING CONTROL SYSTEM AND A METHOD FOR CONTROLLING STEERING

(71) Applicant: KNORR-BREMSE SYSTEME FUER NUTZFAHRZEUGE GMBH, Munich (DE)

(72) Inventors: Kornel Straub, Pomaz (HU); Markus Klein, Pforzheim (DE); Levente Balogh, Szigetszentmiklos (HU); Jonas Leibbrand, Eberdingen-Nussdorf (DE); Tamas Rozsa, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 222 days.

(21) Appl. No.: 16/328,537

(22) PCT Filed: Sep. 8, 2017

(86) PCT No.: PCT/EP2017/072544
§ 371 (c)(1),
(2) Date: Feb. 26, 2019

(87) PCT Pub. No.: WO2018/046638
PCT Pub. Date: Mar. 15, 2018

(65) Prior Publication Data
US 2019/0202499 A1    Jul. 4, 2019

(30) Foreign Application Priority Data
Sep. 12, 2016    (EP) .................................... 16188286

(51) Int. Cl.
*B62D 11/08*    (2006.01)
*B60T 8/1755*    (2006.01)
(Continued)

(52) U.S. Cl.
CPC .......... *B62D 11/08* (2013.01); *B60T 8/17557* (2013.01); *B60W 30/12* (2013.01);
(Continued)

(58) Field of Classification Search
CPC . B62D 11/08; B62D 15/0255; B60T 8/17557; B60T 2201/083; B60T 2201/087;
(Continued)

(56) References Cited

U.S. PATENT DOCUMENTS

2002/0189889 A1    12/2002  Demerly
2006/0076828 A1*    4/2006  Lu ....................... B62D 15/027
303/146
(Continued)

FOREIGN PATENT DOCUMENTS

CN    1796204 A    7/2006
CN    102267462 A    12/2011
(Continued)

OTHER PUBLICATIONS

International Search Report dated Nov. 9, 2017, of the corresponding International Application PCT/EP2017/072544 filed Sep. 8, 2017.

*Primary Examiner* — Kelly D Williams
(74) *Attorney, Agent, or Firm* — Norton Rose Fulbright US LLP; Gerard Messina; Aaron Deditch

(57) ABSTRACT

A steering control system for a commercial vehicle having braking and steering systems. The braking system brakes dissymetrically side wheels of the vehicle. The steering system steers the vehicle based on a steering signal. The steering control system includes selection and control modules. The selection module switches between first and second steering modes. The first mode indicates steering of the
(Continued)

vehicle by turning vehicle wheels. The second mode indicates steering of the vehicle by generating a braking signal for at least one wheel providing a yaw moment applied to the vehicle. The control module generates the first signal indicating a steering demand in the first mode and a second signal indicating a steering demand in the second mode. The control module provides the first signal to the steering system and the second signal to the braking system to brake the vehicle dissymetrically to steer the vehicle with the yaw moment.

9 Claims, 5 Drawing Sheets

(51) Int. Cl.
*B60W 30/12* (2020.01)
*B60W 30/17* (2020.01)
*B62D 15/02* (2006.01)

(52) U.S. Cl.
CPC ......... *B60W 30/17* (2013.01); *B62D 15/0255* (2013.01); *B60T 2201/081* (2013.01); *B60T 2201/083* (2013.01); *B60T 2201/087* (2013.01)

(58) Field of Classification Search
CPC .. B60T 2201/081; B60W 30/12; B60W 30/17
See application file for complete search history.

(56) References Cited

U.S. PATENT DOCUMENTS

| | | | | |
|---|---|---|---|---|
| 2011/0190972 | A1* | 8/2011 | Timmons | G08G 1/166 701/31.4 |
| 2016/0325721 | A1* | 11/2016 | Jonasson | B62D 6/003 |
| 2017/0313309 | A1* | 11/2017 | Morales Teraoka | B60W 10/20 |
| 2018/0194365 | A1* | 7/2018 | Bae | B60W 10/18 |

FOREIGN PATENT DOCUMENTS

| | | |
|---|---|---|
| CN | 102765386 A | 11/2012 |
| CN | 102897169 A | 1/2013 |
| CN | 103963783 A | 8/2014 |
| CN | 104210492 A | 12/2014 |
| CN | 104417555 A | 3/2015 |
| DE | 10017279 A2 | 10/2000 |
| DE | 102007026215 A1 | 12/2008 |
| DE | 102012211901 A1 | 1/2014 |
| EP | 2853453 A1 | 4/2015 |
| EP | 2998175 A1 | 3/2016 |

* cited by examiner

STEERING CONTROL SYSTEM AND A METHOD FOR CONTROLLING STEERING

FIELD OF THE INVENTION

The present invention relates to a steering control system and a method for controlling steering and, in particular, a system for controlling the lateral movement of a vehicle using a Steer-by-Brake process.

BACKGROUND INFORMATION

Vehicles are nowadays equipped with a number of assist functions to support the driver in various situations. For example, a traffic jam assist function helps the driver to keep a secure distance to a vehicle ahead while following the traffic lane. Such traffic jam assist function is implemented in conventional systems only during low speed operations as for example in stop & go situations. In these situations, however, the vehicle has to brake frequently resulting in an increased brake lining wear. In addition, in conventional systems it is difficult to follow the traffic lane autonomously, because the autonomous actuation of the steering system, in particular for commercial vehicles, is technically very involved.

Therefore, there is a demand of a steering control system which can be used easily, in particular, for the traffic jam situation without increasing the brake lining wear.

SUMMARY OF THE INVENTION

At least some of the above-mentioned problems may be solved by a steering control system as described herein and a vehicle as described herein, and a method for controlling steering as described herein. The dependent claims relate to further specifically advantageous realizations of the steering control system as described herein.

The present invention relates to a steering control system for a commercial vehicle. The commercial vehicle comprises a braking system and a steering system, the braking system is configured to brake dissymetrically side wheels of the vehicle, and the steering system is configured to steer the vehicle in response to a steering signal. The steering control system comprises a selection module and a control module. The selection module is configured to select a first steering mode or a second steering mode, wherein the first steering mode relates to a steering of the vehicle by turning vehicle wheels and the second steering mode relates to a steering of the vehicle by generating a braking signal for at least one vehicle wheel resulting in a yaw moment applied to the vehicle. The control module is configured to generate a first steering signal indicating a steering demand if the first steering mode is selected and a second steering signal indicating a steering demand if the second steering mode is selected. The control module is further configured to provide the first steering signal to the steering system and the second steering signal to the braking system to brake the vehicle wheels dissymetrically and thereby steer the vehicle as a result of the generated yaw moment. For example, the front right wheel may be braked stronger than the front left wheel (or vice versa) resulting in a right turn (or left turn).

Optionally, the selection module comprises an interface for the driver of the commercial vehicle to enable the driver to select (or switch) the first steering mode or the second steering mode in response to an interaction of the driver with the interface. Thus, the driver can intentionally turn on/off the second steering mode. The switching is not performed automatically by the vehicle as e.g. in stabilization systems as ESP.

The commercial vehicle may be adapted to be operated in a traffic jam assistant mode (e.g. using a traffic jam assistant unit), and the selection module is optionally configured to activate the second steering mode in the traffic jam assistant mode. Again, the activation of the traffic jam assistant mode is done by the driver explicitly. In the traffic jam assistant mode, the vehicle may follow an object ahead (e.g. another vehicle) while maintaining a safe distance to the object and staying inside a given traffic lane (and does not pass the object ahead).

The vehicle may comprise at least one sensor (e.g. a camera) to detect a misalignment of the vehicle with the traffic lane and the control module is optionally configured to receive a signal indicating the misalignment and to generate, based thereon, a second steering signal to correct the misalignment and to further follow the lane. This alignment correction can be combined with the distance control to the object ahead, i.e. any unsafe distance can be corrected by braking the vehicle accordingly.

The present invention is, however, not limited to the traffic assistant mode, but may also be employed in other turning operations. For example, the control module may optionally be configured to generated a second steering signal for performing a lane change autonomously.

In addition, the vehicle may comprise at least one sensor for detecting a vehicle ahead and the control module may be configured to generate a second steering signal to follow the vehicle ahead.

Optionally, the vehicle may also comprise at least one braking sensor for detecting a braking request or a deceleration of the vehicle and the selection module may be configured to switch to the second steering mode in response to a detected braking signal or deceleration of the vehicle.

The present invention relates also to a vehicle with a steering control system, as it was defined before. The vehicle may, in particular, be a commercial vehicle with a steering system having a positive scrub radius to amplify steering operation when braking dissymetrically. The steering system of the vehicle may comprise a steering column, which is controlled to be turned during steering in the first steering mode.

The present invention relates also to a method of controlling steering for the commercial vehicle. The commercial vehicle comprises a braking system and a steering system, the braking system is configured to brake dissymetrically side wheels of the vehicle, and the steering system is configured to steer the vehicle in response to a steering signal. The method comprises the steps of:
  selecting a first steering mode or a second steering mode, wherein the first steering mode performs a steering of the vehicle by turning vehicle wheels and the second steering mode performs a steering of the vehicle by generating a braking signal for at least one vehicle wheel resulting in a yaw moment applied to the vehicle; and
  generating a first steering signal indicating a steering demand in the first steering mode and a second steering signal indicating a steering demand in the second steering mode, and
  providing the first steering signal to the steering system and the second steering signal to the braking system to brake the vehicle dissymetrically and thereby steer the vehicle as a result of the generated yaw moment.

This method may also be implemented in software or a computer program product and the order of steps may not be important to achieve the desired effect. Embodiments of the present invention can, in particular, be in an engine control unit or implemented by software or a software module in an ECU (electronic control unit). Therefore, embodiment relate also to a computer program having a program code for performing the method, when the computer program is executed on a processor.

According to the present invention the steering actuators are not actively used to control the lateral movement of the vehicle—in particular not for steering the vehicle in special situation as the autonomous driving. Instead, according to embodiments, the steer-by-braking function is actively employed as a regular driving function. This function is not only being used as a backup system to enable a steering in case the regular steering system fails. This new normal operation mode is especially employed during a traffic jam situation where frequent stopping operations can be used to re-align the vehicle along a traffic lane. Hence, when the traffic jam assistant function is activated, the steering control system can likewise be switched in the second steering mode to enable the steer-by-brake function. Further advantageous applications of embodiments of the present invention relate to functions as preventing a lane departure of the vehicle at regular cruising speed.

A particular advantage of embodiments of the present invention is that active steering actuators are not needed while still enabling an autonomous control of the vehicle. Since such active steering actuators are expensive and moreover not standard in commercial vehicles, embodiments can be easily implemented even in heavy commercial vehicles to enable an automatic steering. This is made possible by using the braking system to correct the orientation of the vehicle along the road.

Some examples of the system and/or methods will be described in the following by way of examples only, and with respect to the accompanying figures.

DETAILED DESCRIPTION

Figure 1:
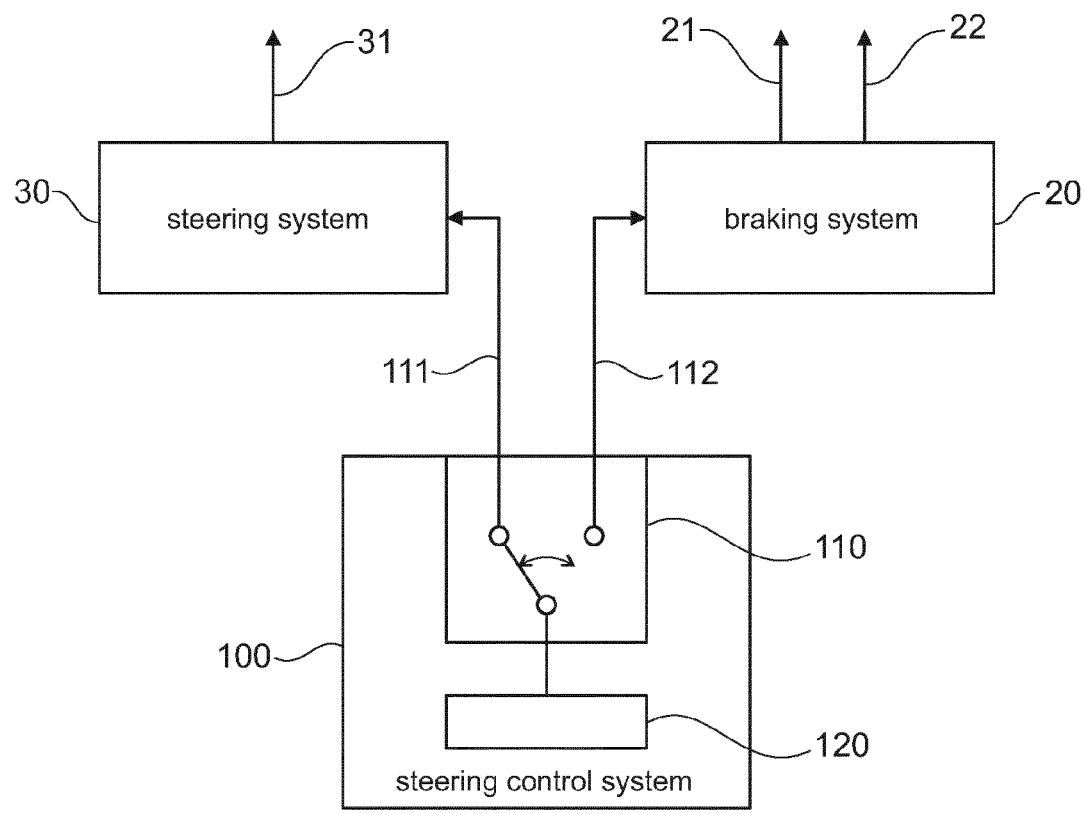
FIG. 1 depicts a steering control system according to an embodiment of the present invention.

FIG. 1 shows a steering control system 100 suitable for a commercial vehicle, which comprises a braking system 20 and a steering system 30. The braking system 20 is able to brake dissymmetrically side wheels of the vehicle and the steering system is able to steer the vehicle in response to a steering signal by turning the wheels. The steering control system 100 comprises a selection module 110 and a control module 120. The control module 120 is configured to generate the first steering signal 111 indicating a steering demand in a first steering mode and a second steering signal 112 indicating a steering demand in the second steering mode. The selection module 110 is configured to switch between the first steering mode and the second steering mode, wherein the first steering mode steers of the vehicle by turning vehicle wheels in response to a first steering signal 111. In the second steering mode a steering of the vehicle is achieved by generating a braking signal 21, 22 for at least one vehicle wheel resulting in a yaw moment applied to the vehicle. This yaw moment results in a rotation force and is controlled by the strength or degree of the dissymmetrical braking force.

Although FIG. 1 sows the selection module 110 between the control module 120 and the steering/braking systems 20, 30, this arrangement shall illustrate only one possibility. In further embodiments the selection module 110 (or part thereof) may be arranged to receive a signal from the control module 120 or within the control module 120 so that the control module 120 is able to generate different signals based on the selected mode.

Independently of the concrete arrangement in the steering control system 100, either the first steering signal 111 (in the first switching mode) or the second steering signal 112 (in the second switching mode) is generated. The first steering signal 111 is submitted to the steering system 30 which provides an actuator signal 31 to the steering actuators in order to turn the steered wheels to the left or to the right (for example using a power steering system). The second steering signal 112 is provided to the braking system 20. Based on the second steering signal 112 the braking system 20 generates different or dissymmetrical braking signals 21, 22, which are provided to the right wheel and left wheel. For example, the second steering signal 112 indicate a demand for a right turn of the vehicle. As a result, the braking system 20 provides only a braking signal 22 to the right wheel in order to perform a right movement of the vehicle. Of course, a strength of the dissymmetrical braking signals 21, 22 are adjusted to perform a desired turning operation without destabilizing the vehicle for example, by applying a sharp strong braking force only on one wheel.

Embodiments implement thus the steer-by-brake (SBB) function as a normal operation mode (comfort function) in vehicles, wherein the brakes on each wheel are controlled separately to influence the steering of the vehicle. Embodiments may be implemented at all wheels of the vehicle. However, the most efficient steering effect may be achievable only if the wheels on the front axle are used for the SBB-function. A person skilled in the art will appreciate that this concept has particular advantages for vehicles with a positive scrub radius, which results in an amplification of the steering effect in case dissymmetric (or asymmetric) friction forces apply to the left right wheels. A positive scrub radius is typically implemented in commercial vehicles, since it supports a steering operation. Thus, embodiments of the present invention have particular advantages for commercial vehicles.

Figure 2:
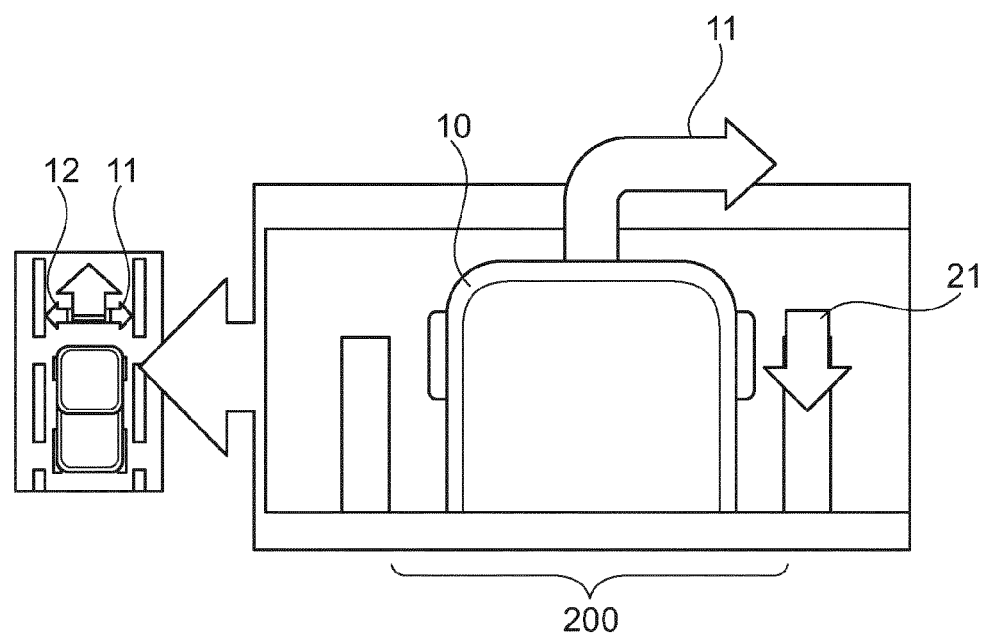
FIG. 2 illustrates how embodiments handle a lane following situation.

FIG. 2 depicts a situation, where a commercial vehicle 10 follows a traffic lane 200 and a braking force 21 is applied to the front right wheel. As a consequence, the vehicle moves to the right as indicated by the arrow 11. This effect can be used to keep an alignment of the vehicle 10 along the traffic lanes 200 (see left hand side in FIG. 2). For example, a deviation of the vehicle to the left-hand side can be corrected by a braking force on the right-wheel resulting in the right movement 11, whereas a deviation to the right-hand side can be corrected by applying a braking force on the left wheel resulting in a left movement 12 of the vehicle. As a result, the vehicle can automatically stay inside the traffic lane 200 without the need to actuate actively the steering system of the vehicle 10.

Figure 3A:
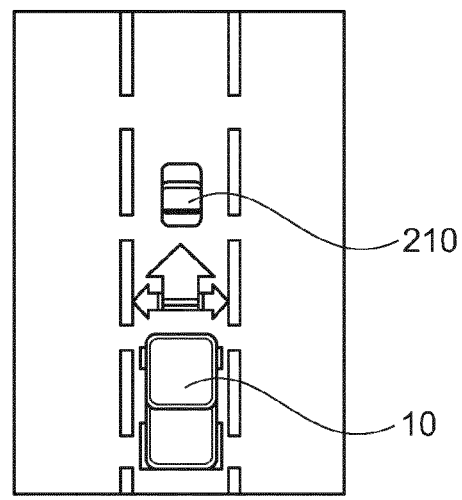
FIGS. 3A and 3B illustrate a traffic jam assist scenario.
Figure 3B:
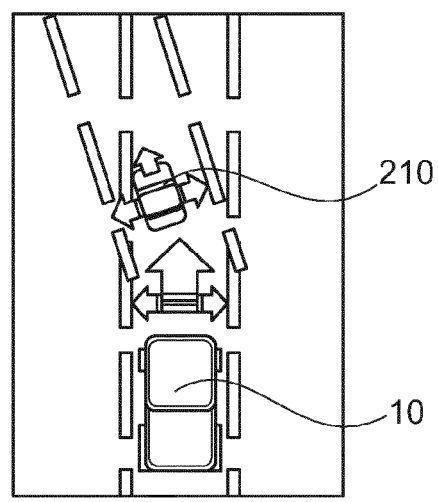

FIG. 3A and FIG. 3B illustrate the traffic jam assist scenario, wherein in FIG. 3A the vehicle 10 follows an object 210 along the traffic lane 200. Again, the alignment of the vehicle 10 along the traffic lane 200 can be maintained as described in FIG. 2. In FIG. 3B the vehicle 10 follows the object 210 when the object 210 leaves the traffic lane 200, for example, to make a lane change. For both cases, the needed steering operations can be carried out using the steering control system 100.

Figure 4:
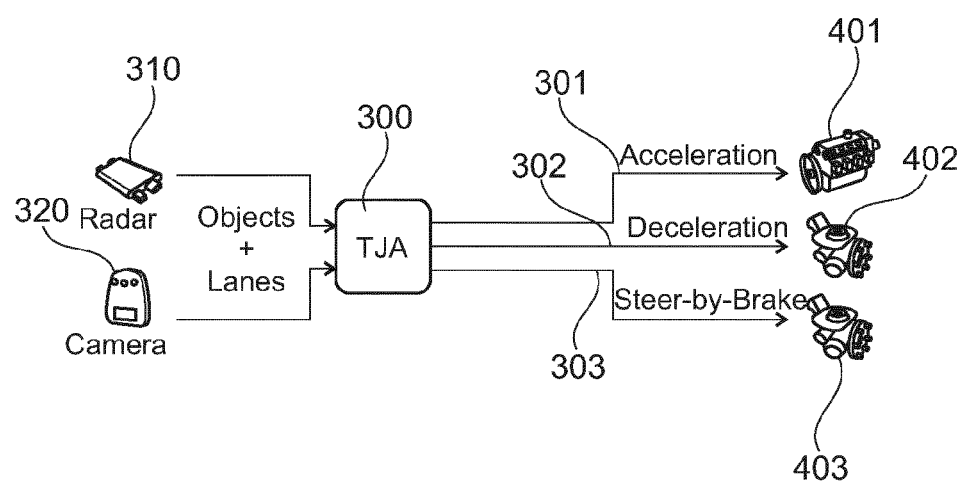
FIG. 4 shows the architecture used for the traffic jam assist unit according to embodiment.

FIG. 4 shows the architecture used for the traffic jam assist function. This architecture involves a traffic jam assist unit 300, which is connected to one or more sensors 310, 320. For example, a radar sensor 310 can measure the distance to the vehicle 210 ahead and a camera sensor 320 can keep track of the traffic lane 200 and provides a sensor signal in the case the vehicle 10 tends to leave the traffic lane 200. This may, for example, be achieved by detecting the lane markings, which should be in a particular angular range, when viewed from the vehicle 10, if the vehicle 10 is running in the middle of the traffic lane 200.

The sensor data of the radar sensor 310 and the exemplary camera 320 are provided for the traffic jam assist unit 300 which is able to detect the object 210, using the radar sensor 310, and to detect any possible lane departure using the exemplary camera 320. The ideal position for the vehicle 10 may, be defined using particular thresholds for the distance to the object 210 ahead and for the angles to the traffic lane markings. Any deviation from a range of acceptable positions may trigger an action in the traffic jam assist unit 300. For example, control signals 301, 302, 303 can be generated to actuate actuators of the vehicle 10 to correct the position and/or alignment of the vehicle 10. The traffic jam assist unit 300 may generate an acceleration signal 301 and provide this signal to an engine 401 in order to accelerate the vehicle 10. The traffic jam assist unit 300 can also generate a deceleration signal 302 and send this signal to the braking system actuators 402 in order to slow down the vehicle 10. According to the present invention, the traffic jam assist unit 300 can further generate a Steer-by-Brake signal 303 and provide this signal to the braking system actuators 403 assigned to this function (e.g. the front axle wheels) to dissymmetrically brake wheels of the vehicle 10 to thereby correct the orientation of the vehicle 10.

The SBB signal 303 may be the second steering signal 112 (see FIG. 1), if the system 100 in included in the traffic jam assist unit 300. It is also possible that the SBB signal 303 can be sent to the steering control system 100 which interprets the signal as a steering demand and generates, based thereon, an appropriate second steering signal 112.

Figure 5:
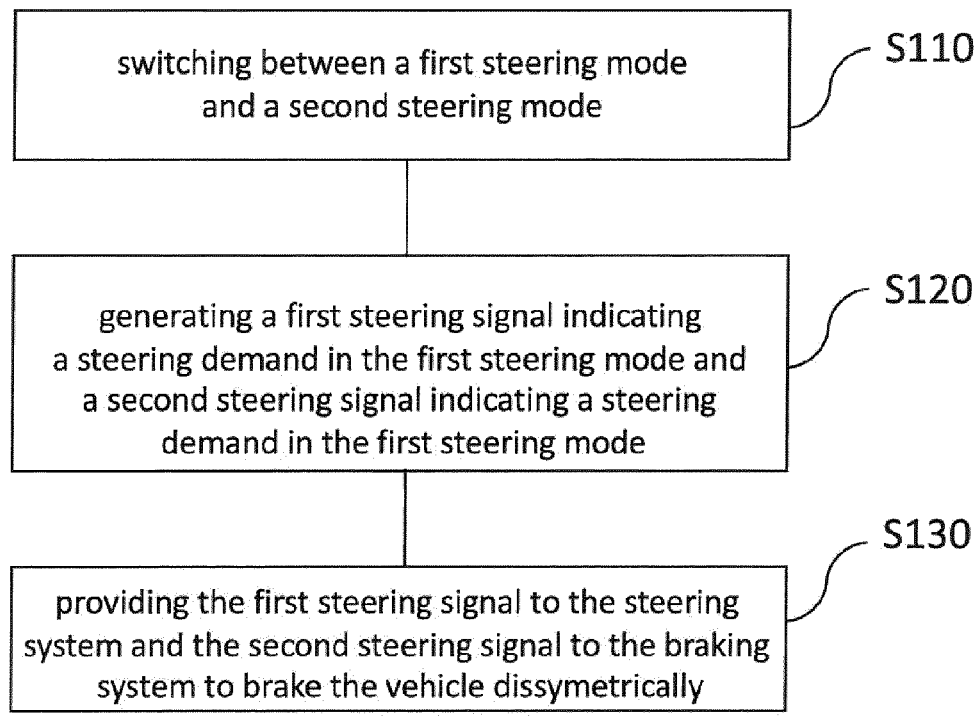
FIG. 5 shows a flow diagram of a method for controlling steering for the commercial vehicle.

FIG. 5 depicts a flow diagram of a method for controlling steering for the commercial vehicle. The method comprises the steps of:
- switching S110 between or selecting a first steering mode and a second steering mode, wherein the first steering mode performs a steering of the vehicle by turning vehicle wheels and the second steering mode performs a steering of the vehicle by generating a braking signal for at least one vehicle wheel resulting in a yaw moment applied to the vehicle;
- generating S120 a first steering signal indicating a steering demand if the first steering mode is switched, and a second steering signal indicating a steering demand if the second steering mode is switched, and
- providing S130 the first steering signal to the steering system or the second steering signal to the braking system to brake the vehicle dissymetrically and thereby steer the vehicle as a result of the yaw moment.

This method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on a computer or processor.

The advantage of embodiments of the present invention is to realize the steering functions without the need of any additional actuator, but using the already installed braking system. By using this system, the control of the lateral movement of the vehicle can be achieved without major modifications of present or of new vehicles. It is even possible that older vehicle architectures can be retrofitted with the new function without involving high costs.

Since current vehicles do not have active steering systems, which could support new functions, embodiments of the present invention can be easily implemented in these commercial vehicles without the need of major modifications.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

The list of reference signs is as follows:
10 vehicle
11,12 right/left movement
30 steering system
31 steering actuator signal
20 braking system
21,22 dissymmetrical braking signals
100 steering control system
110 control module
111 first steering signal
112 second steering signal
120 selection module
200 traffic lane
300 traffic jam assistant unit
310 radar sensor
320 camera
301, 302, . . . control signals of the traffic jam assistant unit
401 engine
402 braking system actuators
403 braking system actuators assigned for SBB function

The invention claimed is:

1. A steering control system for a commercial vehicle, comprising:
   a steering control device configured to perform the following:
   selecting a first steering mode or a second steering mode, wherein the commercial vehicle includes a braking system and a steering system, the braking system being configured to brake dissymetrically side wheels of the commercial vehicle so as to provide a steer-by-brake (SBB) function, the steering system being configured to steer the commercial vehicle in response to a steering signal, and wherein the first steering mode relates to a steering of the commercial vehicle by turning vehicle wheels and the second steering mode relates to a steering of the commercial vehicle by generating a braking signal for at least one vehicle wheel resulting in a yaw moment applied to the commercial vehicle; and generating a first steering signal indicating a first steering demand if the first steering mode is selected and a second steering signal indicating a second steering demand the second steeling mode is selected; and a traffic jam assist unit, which provides a traffic jam assist mode and which is connected to a plurality of sensors including a radar sensor and a camera sensor, wherein the radar sensor measures a distance to another vehicle ahead of the commercial vehicle, and wherein the camera sensor keeps track of a traffic lane;

wherein the commercial vehicle is operable in the traffic jam assist mode using the SBB function, and wherein the second steering mode is activatable in the traffic jam assist mode using the SBB function, wherein sensor data of the radar sensor and the camera sensor are provided to the traffic jam assist unit, which is able to detect objects using the radar sensor and to detect lane departures using the camera sensor, wherein acceptable positions for the commercial vehicle are defined using thresholds for a distance to an object ahead of the commercial vehicle and for angles to traffic lane markings, wherein deviations from a range of the acceptable positions trigger an action in the traffic jam assist unit, which provides control signals to actuate actuators of the commercial vehicle to correct a position and/or an alignment of the commercial vehicle, wherein the traffic jam assist unit is configured to provide acceleration signals and/or deceleration signals to accelerate and/or decelerate the commercial vehicle, wherein the traffic jam assist unit is configured to generate Steer-by-Brake signals and to provide the Steer-by-Brake signals to braking system actuators to dissymmetrically brake wheels of the commercial vehicle so as to correct an orientation of the commercial vehicle, wherein the first steering signal is provided to the steering system and the second steering signal is provided to the braking system to brake the commercial vehicle dissymmetrically, so as to steer the commercial vehicle as a result of the yaw moment, wherein an interface for a driver of the commercial vehicle enables the driver to select the first steering mode or the second steering mode in response to an interaction with the interface.

2. The steering control system of claim 1, wherein the commercial vehicle includes at least one sensor to detect a misalignment of the commercial vehicle within the traffic lane, and wherein a signal is received indicating the misalignment and a third steering signal is generated, based on the signal indicating the misalignment, to correct the misalignment and to further follow the traffic lane.

3. The steering control system of claim 1, wherein a fourth steering signal is generated for performing a lane change autonomously.

4. The steering control system of claim 1, wherein a fifth steering signal is generated to follow the vehicle ahead of the commercial vehicle.

5. The steering control system of claim 1, wherein the commercial vehicle includes at least one braking sensor for detecting a braking request or a deceleration of the commercial vehicle, and wherein, in response to the detected braking request or deceleration of the commercial vehicle, there is a switching to the second steering mode.

6. A vehicle, comprising:
a steering control system configured to perform the following:
selecting a first steering mode or a second steering mode, wherein the vehicle includes a braking system and a steering system, the braking system being configured to brake dissymetrically side wheels of the vehicle so as to provide a steer-by-brake (SBB) function, the steering system being configured to steer the vehicle in response to a steering signal, and wherein the first steering mode relates to a steering of the vehicle by turning vehicle wheels and the second steering mode relates to a steering of the vehicle by generating a braking signal for at least one vehicle wheel resulting in a yaw moment applied to the vehicle; and generating a first steering signal indicating a first steering demand if the first steering mode is selected and a second steering signal indicating a second steering demand if the second steering mode is selected; and a traffic jam assist unit, which provides a traffic jam assist mode and which is connected to a plurality of sensors, including a radar sensor and a camera sensor, wherein the radar sensor measures a distance to another vehicle ahead of the vehicle, and wherein the camera sensor keeps track of a traffic lane;

wherein the vehicle is operable in the traffic jam assist mode using the SBB function, and wherein the second steering mode is activatable in the traffic jam assist mode using the SBB function, wherein sensor data of the radar sensor and the camera sensor are provided to the traffic jam assist unit, which is able to detect objects using the radar sensor and to detect lane departures using the camera sensor, wherein acceptable positions for the vehicle are defined using thresholds for a distance to an object ahead of the vehicle and for angles to traffic lane markings, wherein deviations from a range of the acceptable positions trigger an action in the traffic jam assist unit, which provides control signals to actuate actuators of the vehicle to correct a position and/or an alignment of the vehicle, wherein the traffic jam assist unit is configured to provide acceleration signals and/or deceleration signals to accelerate and/or decelerate the vehicle, wherein the traffic jam assist unit is configured to generate Steer-by-Brake signals and to provide the Steer-by-Brake signals to braking system actuators to dissymmetrically brake wheels of the vehicle so as to correct an orientation of the vehicle, wherein the first steering signal is provided to the steering system and the second steering signal is provided to the braking system to brake the vehicle dissymmetrically, so as to steer the vehicle as a result of the yaw moment, wherein an interface for a driver of the vehicle enables the driver to select the first steering mode or the second steering mode in response to an interaction with the interface.

7. The vehicle of claim 6, wherein the vehicle is a commercial vehicle,
wherein the steering system has a positive scrub radius to amplify steering operation by dissymmetrical braking, and wherein the steering system includes a steering column which is turned during steering in the first steering mode.

8. A method of controlling a steering for a commercial vehicle, the method comprising:
selecting a first steering mode or a second steering mode, wherein the commercial vehicle includes a braking system and a steering system, the braking system being configured to brake dissymetrically side wheels of the commercial vehicle so as to provide a steer-by-brake (SBB) function, the steering system being configured to steer the commercial vehicle in response to a steering signal, wherein the first steering mode indicates a steering of the commercial vehicle by turning vehicle wheels and the second steering mode indicates a steering of the commercial vehicle by generating a braking signal for at least one vehicle wheel resulting in a yaw moment applied to the commercial vehicle;
generating a first steering signal indicating a first steering demand in the first steering mode and a second steering signal indicating a second steering demand in the second steering mode,
providing the first steering signal to the steering system and the second steering signal to the braking system to brake the commercial vehicle dissymetrically, so as to steer the commercial vehicle as a result of the yaw moment; and
providing a traffic jam assist mode, via a traffic jam assist unit, which is connected to a plurality of sensors, including a radar sensor and a camera sensor, wherein the radar sensor measures a distance to another vehicle ahead of the commercial vehicle, and wherein the camera sensor keeps track of a traffic lane;
wherein the commercial vehicle is operable in the traffic jam assist mode using the SBB function, and wherein the second steering mode is activatable in the traffic jam assist mode using the SBB function,
wherein sensor data of the radar sensor and the camera sensor are provided to the traffic jam assist unit, which is able to detect objects using the radar sensor and to detect lane departures using the camera sensor,
wherein acceptable positions for the commercial vehicle are defined using thresholds for a distance to an object ahead of the commercial vehicle and for angles to traffic lane markings, wherein deviations from a range of the acceptable positions trigger an action in the traffic jam assist unit, which provides control signals to actuate actuators of the commercial vehicle to correct a position and/or an alignment of the commercial vehicle,
wherein the traffic jam assist unit is configured to provide acceleration signals and/or deceleration signals to accelerate and/or decelerate the commercial vehicle,
wherein the traffic jam assist unit is configured to generate Steer-by-Brake signals and to provide the Steer-by-Brake signals to braking system actuators to dissymmetrically brake wheels of the commercial vehicle so as to correct an orientation of the commercial vehicle,
wherein an interface for a driver of the commercial vehicle enables the driver to select the first steering mode or the second steering mode in response to an interaction with the interface.

9. A non-transitory computer readable medium having a computer program, which is executable by a processor, comprising:
a program code arrangement having a program code for controlling a steering for a vehicle, by performing the following:
selecting a first steering mode or a second steering mode, wherein the vehicle includes a braking system and a steering system, the braking system being configured to brake dissymetrically side wheels of the vehicle so as to provide a steer-by-brake (SBB) function, the steering system being configured to steer the vehicle in response to a steering signal, wherein the first steering mode indicates a steering of the vehicle by turning vehicle wheels and the second steering mode indicates a steering of the vehicle by generating a braking signal for at least one vehicle wheel resulting in a yaw moment applied to the vehicle;
generating a first steering signal indicating a first steering demand in the first steering mode and a second steering signal indicating a second steering demand in the second steering mode;
providing the first steering signal to the steering system and the second steering signal to the braking system to brake the vehicle dissymetrically, so as to steer the vehicle as a result of the yaw moment; and
providing a traffic jam assist mode, via a traffic jam assist unit, which is connected to a plurality of sensors, including a radar sensor and a camera sensor, wherein the radar sensor measures a distance to another vehicle ahead of the vehicle, and wherein the camera sensor keeps track of a traffic lane;
wherein the vehicle is operable in the traffic jam assist mode using the SBB function, and wherein the second steering mode is activatable in the traffic jam assist mode using the SBB function, wherein sensor data of the radar sensor and the camera sensor are provided to the traffic jam assist unit, which is able to detect objects using the radar sensor and to detect lane departures using the camera sensor,
wherein acceptable positions for the vehicle are defined using thresholds for a distance to an object ahead of the commercial vehicle and for angles to traffic lane markings, wherein deviations from a range of the acceptable positions trigger an action in the traffic jam assist unit, which provides control signals to actuate actuators of the vehicle to correct a position and/or an alignment of the vehicle,
wherein the traffic jam assist unit is configured to provide acceleration signals and/or deceleration signals to accelerate and/or decelerate the vehicle,
wherein the traffic jam assist unit is configured to generate Steer-by-Brake signals and to provide the Steer-by-Brake signals to braking system actuators to dissymmetrically brake wheels of the vehicle so as to correct an orientation of the vehicle,
wherein an interface for a driver of the vehicle enables the driver to select the first steering mode or the second steering mode in response to an interaction with the interface.

* * * * *